US010107162B2

(12) United States Patent
Bruene

(10) Patent No.: US 10,107,162 B2
(45) Date of Patent: Oct. 23, 2018

(54) CATALYST SUBASSEMBLY, DEVICE COMPRISING SAME FOR PURIFYING EXHAUST GASES FROM AN INTERNAL COMBUSTION ENGINE, MODULAR SYSTEM FOR THE SUBASSEMBLY, AND METHOD FOR MANUFACTURING THE SUBASSEMBLY

(71) Applicant: Bayerische Motoren Werke Aktiengesellschaft, Munich (DE)

(72) Inventor: Hans-Juergen Bruene, Haag (AT)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 84 days.

(21) Appl. No.: 15/298,309

(22) Filed: Oct. 20, 2016

(65) Prior Publication Data

US 2017/0037755 A1 Feb. 9, 2017

Related U.S. Application Data

(63) Continuation of application No. PCT/EP2015/055599, filed on Mar. 18, 2015.

(30) Foreign Application Priority Data

Apr. 22, 2014 (DE) .................. 10 2014 207 530

(51) Int. Cl.
*F01N 13/18* (2010.01)
*F01N 3/021* (2006.01)
(Continued)

(52) U.S. Cl.
CPC ............ *F01N 3/0211* (2013.01); *F01N 3/023* (2013.01); *F01N 3/0222* (2013.01); *F01N 3/035* (2013.01);
(Continued)

(58) Field of Classification Search
CPC .... F01N 3/2842; F01N 3/2892; F01N 13/011; F01N 13/017; F01N 2450/30
See application file for complete search history.

(56) References Cited

U.S. PATENT DOCUMENTS

2006/0233679 A1 10/2006 Hemmatpour et al.
2009/0199546 A1 8/2009 Doring
(Continued)

FOREIGN PATENT DOCUMENTS

| CN | 101507899 A | 8/2009 |
|---|---|---|
| CN | 101979846 A | 2/2011 |

(Continued)

OTHER PUBLICATIONS

Chinese-language Office Action issued in counterpart Chinese Application No. 201580004006.9 dated Jan. 10, 2018 with English translation (Twelve (12) pages).

(Continued)

*Primary Examiner* — Jonathan Matthias
(74) *Attorney, Agent, or Firm* — Crowell & Moring LLP

(57) ABSTRACT

A catalyst subassembly for a device for purifying exhaust gases from an internal combustion engine, in particular a diesel engine, includes an SCRF catalyst and an SCR catalyst upstream of the SCRF catalyst. The two catalysts are arranged in a common catalyst housing. The catalyst housing, the SCRF catalyst and the SCR catalyst can be selected from a modular system for different variants of the internal combustion engine.

19 Claims, 1 Drawing Sheet

(51) Int. Cl.
*F01N 3/20* (2006.01)
*F01N 3/28* (2006.01)
*F01N 3/022* (2006.01)
*F01N 3/035* (2006.01)
*F01N 13/00* (2010.01)
*F01N 3/023* (2006.01)

(52) U.S. Cl.
CPC ............ *F01N 3/2066* (2013.01); *F01N 3/28* (2013.01); *F01N 3/2807* (2013.01); *F01N 3/2825* (2013.01); *F01N 3/2842* (2013.01); *F01N 3/2882* (2013.01); *F01N 13/009* (2014.06); *F01N 13/0093* (2014.06); *F01N 2250/02* (2013.01); *F01N 2330/00* (2013.01); *F01N 2340/00* (2013.01); *F01N 2450/00* (2013.01); *F01N 2450/02* (2013.01); *F01N 2610/00* (2013.01); *F01N 2610/02* (2013.01); *Y02T 10/24* (2013.01)

(56) References Cited

U.S. PATENT DOCUMENTS

| | | |
|---|---|---|
| 2010/0319320 A1 | 12/2010 | Mital et al. |
| 2011/0078997 A1 | 4/2011 | Boorse et al. |
| 2011/0138776 A1 | 6/2011 | Huang et al. |
| 2011/0162347 A1 | 7/2011 | Katare et al. |
| 2011/0165040 A1 | 7/2011 | Huang et al. |
| 2012/0102928 A1 | 5/2012 | Hehle et al. |
| 2013/0115150 A1 | 5/2013 | Fritsch et al. |
| 2013/0209319 A1* | 8/2013 | Schaffner ................ F01N 3/035 422/169 |
| 2014/0093442 A1 | 4/2014 | Spreitzer et al. |

FOREIGN PATENT DOCUMENTS

| | | |
|---|---|---|
| CN | 102527231 A | 7/2012 |
| CN | 103702745 A | 4/2014 |
| DE | 103 23 607 A1 | 12/2004 |
| DE | 10 2005 017 378 A1 | 11/2006 |
| DE | 10 2009 038 835 A1 | 3/2011 |
| DE | 10 2011 079 785 A1 | 2/2012 |
| DE | 10 2011 085 952 A1 | 5/2013 |
| DE | 10 2012 209 852 A1 | 12/2013 |
| EP | 1 203 611 B1 | 2/2011 |
| EP | 2 419 610 A1 | 2/2012 |
| EP | 1 837 494 B1 | 5/2012 |
| WO | WO 2005/016497 A1 | 2/2005 |

OTHER PUBLICATIONS

International Search Report (PCT/ISAI210) issued in PCT Application No. PCT/EP2015/055599 dated Jun. 1, 2015, with English translation (four (4) pages)

German Search Report issued in counterpart German Application No. 10 2014 207 530.0 dated Jan. 9, 2015, with partial English translation (fifteen (15) pages)

\* cited by examiner

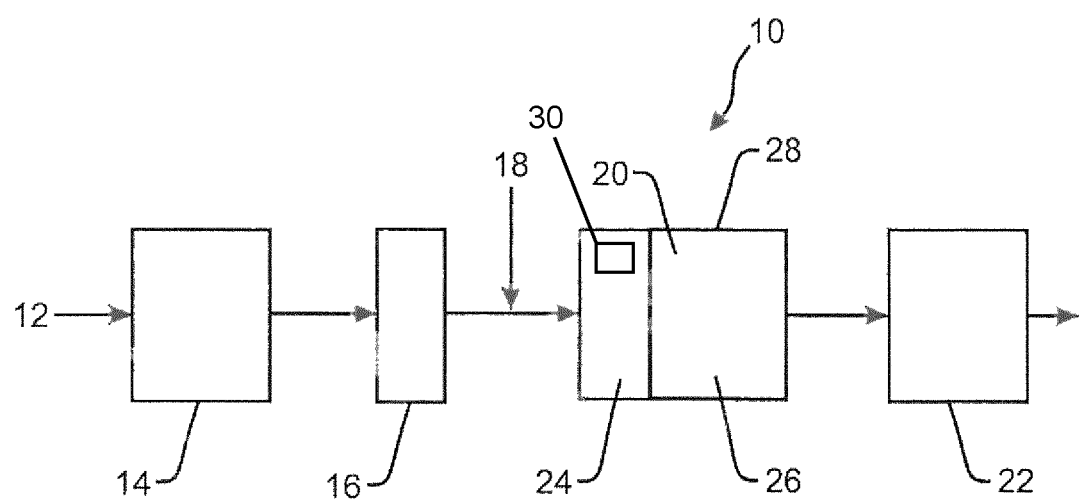

CATALYST SUBASSEMBLY, DEVICE COMPRISING SAME FOR PURIFYING EXHAUST GASES FROM AN INTERNAL COMBUSTION ENGINE, MODULAR SYSTEM FOR THE SUBASSEMBLY, AND METHOD FOR MANUFACTURING THE SUBASSEMBLY

CROSS REFERENCE TO RELATED APPLICATIONS

This application is a continuation of PCT International Application No. PCT/EP2015/055599, filed Mar. 18, 2015, which claims priority under 35 U.S.C. § 119 from German Patent Application No. 10 2014 207 530.0, filed Apr. 22, 2014, the entire disclosures of which are herein expressly incorporated by reference.

BACKGROUND AND SUMMARY OF THE INVENTION

The invention relates to a catalyst subassembly for a device for purifying exhaust gases from an internal combustion engine, in particular a diesel engine, having a particulate filter that can be regenerated and an integral catalyst on the particulate filter for selective reduction of nitrogen oxides (SCRF catalyst). The invention furthermore relates to a modular system for the catalyst subassembly, to a device containing the catalyst subassembly and to a method for producing the catalyst subassembly.

To purify the exhaust gases from modern motor vehicles, especially diesel vehicles, use is generally made of catalyst arrangements comprising a combination of an oxidation catalyst or an NOx storage catalyst and a particulate filter. The close-coupled oxidation catalysts and particulate filters are generally installed in a common housing. To comply with stricter exhaust limits, the oxidation catalyst can be replaced by an NOx storage catalyst within the same overall volume.

In the oxidation catalyst, carbon monoxide and volatile hydrocarbons are oxidized to form carbon dioxide. The oxidation catalyst generally consists of a metallic or ceramic supporting substrate having a catalytically active coating composed of metals from the platinum group, such as platinum and/or palladium. Since the exhaust gas temperatures of a diesel engine are significantly lower than the exhaust gas temperatures of a spark ignition engine, oxidation catalysts for diesel engines (DOC) are preferably installed close to the exhaust manifold.

Wall flow filters and bypass flow filters can be used as particulate filters that can be regenerated. In the case of wall flow filters, soot particles and other solids present in the exhaust gas flow are fixed on a porous filter wall by adhesion. When the exhaust gas backpressure reaches a predetermined threshold value owing to particulate deposits, regeneration of the particulate filter is initiated. For this purpose, an afterinjection of fuel into the exhaust gas flow can be carried out, for example, in order to increase the exhaust gas temperature and burn the soot particles deposited in the filter. In the case of the bypass flow filter technique, some of the exhaust gas flow is diverted and passed through a nonwoven layer. During this process, the soot particles are filtered out. In the case of bypass flow filters, continuous regeneration is generally performed.

For heavy vehicles, the catalyst arrangement consisting of an oxidation catalyst and a particulate filter can be supplemented by an SCR catalyst. Here, SCR (selective catalytic reduction) refers to the selective catalytic reduction of nitrogen oxides (NOx) from exhaust gases of internal combustion engines. An SCR catalyst of this kind is described in EP 1 203 611 B1 or EP 1 837 494 B1, for example.

To operate the SCR catalyst, a reducing agent for the nitrogen oxides, e.g. an aqueous urea solution, which can be obtained commercially in the form of "AdBlue™", is sprayed into the exhaust gas flow upstream of the catalyst. In the SCR catalyst, hydrolysis of the urea solution to form ammonia is performed in a first step, and conversion of ammonia and NOx to water and nitrogen is performed in a second step.

DE 103 23 607 A1, WO 2005/016497 and U.S. 2011/0078997 each disclose catalysts which have a combination of an SCR catalyst and a particulate filter on a single substrate. These catalysts are generally referred to as SCRF catalysts (SCR on filter) and can both fix soot particles and reduce nitrogen oxides NOx to form nitrogen.

DE 10 2012 209 852 A1 shows a catalyst arrangement in which an SCRF system is supplemented by a downstream SCR catalyst, wherein the SCR catalyst has an additional storage function for hydrocarbons. An oxidation catalyst, which can oxidize the hydrocarbons and carbon monoxide, is arranged downstream of the SCR catalyst.

DE 10 2009 038 835 A1 discloses an exhaust gas purification system which has a first SCR catalyst upstream of an oxidation catalyst and a particulate filter and has a further SCR catalyst downstream of the particulate filter.

DE 10 2011 079 785 discloses an exhaust system in which a first oxidation catalyst (DOC) is provided, which is followed in the direction of flow of the exhaust gas by an SCR unit and a second DOC. This system is intended to ensure lower hydrocarbon emissions. The SCR unit can be supplemented by a SCRF catalyst positioned after said SCR unit.

The catalyst arrangements mentioned above are designed to comply with the ever stricter limits for the nitrogen oxide and hydrocarbon content of exhaust gases from internal combustion engines.

However, one disadvantage of close-coupled SCRF catalysts is that the component volume of the SCRF catalyst is greater than the previously used particulate filters coated with noble metal, also referred to as "Coated Soot Filters" (CSF). In the past, design parameters for the CSF included the "ash accumulation capacity" and the maximum exhaust gas mass flow of the internal combustion engine. In addition, the NOx conversion of the SCRF catalyst must also be taken into account, leading to a larger component volume. However, the larger component volume of the SCRF catalyst entails an increased weight, higher costs and greater thermal inertia.

It is the object of the present invention to provide an exhaust gas purification system which is reliable in all operating situations, which can be manufactured at low cost and with which the above disadvantages can be avoided.

These and other objects are achieved by means of a catalyst subassembly for a device for purifying exhaust gases from an internal combustion engine, in particular a diesel engine, in accordance with embodiments of the invention.

According to the invention, the catalyst subassembly includes a particulate filter that can be regenerated and an integral catalyst on the particulate filter for selective reduction of nitrogen oxides (SCRF catalyst). A catalyst for selective reduction of nitrogen oxides (SCR catalyst) is provided upstream of the SCRF catalyst, wherein the SCRF catalyst and the SCR catalyst are arranged in a common catalyst housing.

Thus, an aspect of the invention is a hybrid construction which includes an SCR catalyst on a dedicated supporting substrate and an SCRF catalyst positioned after said SCR catalyst and having a component volume which corresponds to the volume of a CSF customary for the respective variant of the internal combustion engine. This hybrid construction has the advantage that a modular system for different vehicles can be provided, in which the SCRF catalysts are of identical dimensions and the dimensions of the SCR catalysts are varied, depending on the vehicle size or the engine variant. The catalyst subassembly can therefore be produced at lower cost.

Further advantages of the catalyst subassembly according to the invention are obtained by virtue of the fact that the SCR catalyst exhibits a more rapid light off behavior of the SCR function in normal operation and better NOx conversion in the emissions cycle by virtue of its lower thermal inertia. This results in improved efficiency of the catalyst subassembly for the same overall volume. The smaller volume of the particulate filter furthermore results in a lower overall weight. Moreover, the costs of the hybrid system are lower since the SCR catalyst can be manufactured more advantageously than a particulate filter. In the regeneration mode of the particulate filter, the subassembly can heat up more quickly because of the lower heat capacity of the SCR filter.

According to a preferred embodiment, the SCR catalyst includes a metallic or ceramic through-flow substrate. The through-flow substrate is typically a honeycomb monolith with a series of elongate channels which extend through the monolith, wherein the channels are open at both ends. A through-flow substrate of this kind can be manufactured with different axial extents at low cost. In this way, the NOx conversion of the SCR catalyst can be matched easily to different engine variants. The differences in the various axial extents are greater here than the manufacturing tolerances which generally occur in the manufacture of substrate monoliths for catalysts.

The SCRF catalyst is preferably formed as a filtering monolith, particularly preferably as a wall flow filter, e.g. in the form of a ceramic porous filter substrate which has a multiplicity of inlet channels arranged parallel to one another and a multiplicity of outlet channels. Each inlet channel and each outlet channel is partially defined by a ceramic wall of a porous structure. In this arrangement, each inlet channel is alternately separated from an outlet channel and vice versa by a ceramic wall of a porous structure. In other words, the wall flow filter is a honeycomb arrangement which defines a multiplicity of first channels closed at the upstream end and a multiplicity of second channels, which are not closed at the upstream end but are closed at the downstream end. Channels which are vertically and laterally adjacent to a first channel are closed at the downstream end. When viewed from one of the ends, the alternately closed and open ends of the channels have the appearance of a chessboard.

The SCRF catalyst can be designed as a full extrudate or as a coated supporting substrate. Suitable catalytically active substances include mixed oxides of vanadium and titanium, iron- and copper-containing zeolites and mixtures thereof.

The through-flow substrate of the SCR catalyst is preferably a disk-shaped honeycomb monolith, in particular one which has a cross section which is substantially cylindrical or polygonal, preferably rectangular. The geometry of the through-flow substrate is preferably matched to the external dimensions of the SCRF catalyst.

As a catalytically active component for the SCR catalyst, the conventional coatings and full extrudates known in the prior art can be used. Examples of suitable catalysts for selective reduction of nitrogen oxides are copper-containing compounds, mixed oxides and oxide mixtures of vanadium oxide and titanium dioxide and optionally tungsten oxide, molybdenum oxide and silicon dioxide, iron- and copper-containing zeolites and acidic zeolites, which can be partially exchanged with metal ions, and mixtures thereof.

As a particularly preferred option, at least one spacer element is provided between the SCR catalyst and the SCRF catalyst or an axial wall surface of the catalyst housing. By use of the spacer elements, the different axial extents of the SCR catalyst can be compensated while keeping the volume of the catalyst housing and of the SRCF catalyst constant. Solid spacers and/or nonwovens, knitted fabrics and woven fabrics can be used as spacer elements, these also generally being used to compensate manufacturing tolerances in the catalyst substrates. Heat-resistant wire meshes are preferred.

The invention furthermore relates to a modular system for the catalyst subassembly. The modular system according to the invention serves for use for a plurality of variants of an internal combustion engine, in particular a diesel engine, and includes a plurality of catalyst housings and SCRF catalysts, which are each dimensioned for the plurality of variants of the internal combustion engine independently of the engine variant, and a set of different SCR catalysts, which are each dimensioned for the plurality of variants of the internal combustion engine in a manner dependent on the engine variant and have different outside dimensions.

The SCRF catalysts and the catalyst housings of the modular system preferably each have identical external dimensions, which are suitable for use with a plurality of engine variants. The catalyst housings and SCRF catalysts in the module can preferably each have an identical volume and/or an identical ratio of length to cross section.

Here, identical external dimensions or an identical volume or an identical ratio of length to cross section means that the dimensions of the SCRF catalysts and/or of the catalyst housings in the module fluctuate only within the normal manufacturing tolerances. Matching to a plurality of engine variants is accomplished by optimizing and defining the dimensions or dimensioning of the catalyst housing and of the SCRF catalyst, thus achieving a sufficient reduction in pollutants while complying with predetermined limits for all engine variants of the module without an additional SCR catalyst.

Dimensions of the plurality of SCR catalysts in the modular system are preferably chosen so that the respective SCR catalyst has an axial extent matched to the associated engine variant and optionally the dimensions of the SCRF catalyst. By selecting the SCR catalyst with the axial extent that matches the respective engine variant, the nitrogen oxides in the exhaust gas flow, in particular, can then be lowered to values below the legal limits.

In addition, the modular system can include a set of different spacer elements, which are matched to the dimensioning of the plurality of SCR catalysts. Since differently dimensioned SCR catalysts are used, depending on the engine variant, it is possible in this way to compensate any empty spaces that may arise in the catalyst housing. The spacer elements can be solid spacers, such as spacing rings, or the heat-resistant wire meshes that are also used to compensate manufacturing tolerances can be used with different wall thicknesses.

The invention furthermore comprises a device for purifying exhaust gases from an internal combustion engine having the catalyst subassembly according to the invention.

In particular, the device can contain a unit for supplying a reducing agent, in particular ammonia or an ammonia precursor, which is arranged upstream of the catalyst subassembly. The reducing agent is preferably a urea solution that can be obtained commercially in the form of "AdBlue™", the composition of which is internationally standardized. A mixing element or an evaporator, which brings about uniform distribution of the reducing agent in the exhaust gas flow, can be provided downstream of the unit for supplying the reducing agent and ahead of the catalyst subassembly.

Moreover, the device can have a known oxidation catalyst and/or an NOx storage catalyst, which is/are in each case arranged in the exhaust tract upstream of the subassembly and of the unit for supplying a reducing agent.

As a further preferred embodiment, the device can contain an ammonia barrier catalyst which is positioned after the subassembly consisting of the SCR catalyst and the SCRF catalyst and arranged downstream of the subassembly. The ammonia barrier catalyst prevents the troublesome smells due to "ammonia slip", which can be caused by overmetering of the reducing agent.

The method according to the invention for producing the catalyst subassembly from a modular system for a plurality of variants of an internal combustion engine, in particular a diesel engine, comprises the following acts:
a) providing a plurality of catalyst housings and a plurality of SCRF catalysts, each having identical dimensions;
b) selecting an SCR catalyst dimensioned in accordance with the respective engine variant from a set of different SCR catalysts; and
c) assembling the selected SCR catalyst with the SCRF catalyst in the catalyst housing to form the catalyst subassembly.

By way of the method according to the invention, a modular construction of the catalyst subassembly can be achieved. Since only the low-cost SCR catalyst is varied, both the inventory costs and the manufacturing costs of the subassembly can be reduced overall.

According to another embodiment of the method, the module additionally contains a set of differently dimensioned compensating elements, wherein at least one compensating element for the respective engine variant is selected from the set of compensating elements in accordance with the dimensioning of the SCR catalyst and installed in the catalyst housing.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 shows a schematic illustration of a device for purifying exhaust gases from an internal combustion engine having the catalyst subassembly according to the invention.

DETAILED DESCRIPTION OF THE DRAWING

The device 10 shown schematically in FIG. 1 is used, in particular, to purify the exhaust gases 12 from a diesel engine (not shown) and, in the direction of flow of the exhaust gases, includes:

a known exhaust turbocharger 14;
a known oxidation catalyst 16, wherein the oxidation catalyst can be replaced by an NOx storage catalyst or can be combined with an NOx storage catalyst;
a known device 18 for supplying a reducing agent for nitrogen oxides, e.g. an injection device for a urea solution having a mixing element (not shown) positioned after the injection device;
the catalyst subassembly 20 according to the invention; and
a known ammonia barrier catalyst 22, from which the purified exhaust gases can be released into the environment. Instead of the ammonia barrier catalyst 22 or in addition thereto, a further SCR catalyst, an oxidation catalyst or a combination of an SCR catalyst and an oxidation catalyst can be provided, as is known in the prior art.

The catalyst subassembly 20 according to the invention includes an SCR catalyst 24 and an SCRF catalyst 26 positioned after the SCR catalyst and arranged downstream.

The SCR catalyst 24 is used for selective reduction of nitrogen oxides and is preferably designed as a through-flow substrate without a filtering function, in particular as a disk-shaped honeycomb monolith.

The SCRF catalyst 26 is constructed from a particulate filter that can be regenerated and an integral catalyst on the particulate filter for selective reduction of nitrogen oxides.

The SCR catalyst 24 and the SCRF catalyst 26 are arranged in a common catalyst housing 28.

According to the invention, the catalyst subassembly 20 can be a modular system. The modular system allows a modular construction of the catalyst subassembly 20 which can be used for a plurality of variants of an internal combustion engine, in particular a diesel engine.

The module includes a plurality of catalyst housings 28 and a plurality of SCRF catalysts 26, which are each dimensioned for a plurality of variants of the internal combustion engine independently of the engine variant, i.e. they have identical external dimensions. Deviations that lie within the normal manufacturing tolerances are regarded as identical dimensions here.

Moreover, the module includes a set of different SCR catalysts 24, which are each dimensioned for the plurality of variants of the internal combustion engine in a manner dependent on the engine variant.

The catalyst housings 28 and the SCRF catalysts 26 in the module can preferably have an identical volume and/or an identical ratio of length to cross section.

The dimensions of the various SCR catalysts 24 in the modular system are preferably chosen so that the respective SCR catalyst has an axial extent matched to the associated engine variant and optionally a geometry matched to the external dimensions of the SCRF catalyst.

In addition, the modular system can include a set of several different spacer elements 30 (shown schematically), which are matched to the dimensioning of the various SCR catalysts 24. The spacer elements 30 serve to compensate any empty spaces which arise in the catalyst housing owing to the use of SCR catalysts 24 with different dimensions. Solid spacers, such as spacing rings, or the heat-resistant wire meshes that are also used to compensate manufacturing tolerances can be used as spacer elements with different wall thicknesses.

To manufacture the catalyst subassembly 20 from the modular system, a catalyst housing 28 and an SCRF catalyst 26 with predetermined dimensions matched to the plurality of engine variants is first of all prepared. A suitably dimensioned SCR catalyst 24 from a set of SCR catalysts having different dimensions or axial extents is then selected in accordance with the respective engine variant. The catalyst housing 28, the SCRF catalyst 26 and the SCR catalyst 24 selected from the modular system are then installed, optionally together with spacer elements likewise selected from the modular system, to form the catalyst subassembly 20.

As an example of the dimensioning of the catalyst subassembly 20, comparison with a conventional diesel particulate filter (CSF) for a diesel engine with a cubic capacity of 2.0 dm$^3$ may be used:

CSF volume=2.8 dm$^3$

Maintaining the optimum ratio of length to cross section of the CSF, this gives a volume of 3.5 dm$^3$ for an SCRF catalyst.

The hybrid system of the catalyst subassembly 20 made up of an SCR catalyst 24 and an SCRF catalyst 26 can accordingly have the following volume:

$$\text{Volume of hybrid system} = SCR \text{ volume} + SCRF \text{ volume}$$
$$= 0.7 \text{ dm}^3 + 2.8 \text{ dm}^3$$
$$= 3.5 \text{ dm}^3$$

For use with a different engine variant, the SCRF volume is retained and only the SCR volume or the axial extent of the SCR through-flow substrate is varied. With the modular system according to the invention, it is thus possible to achieve a low-cost modular construction of the catalyst subassembly. At the same time, there are also technical advantages since the SCR through-flow substrate has a lower heat capacity and exhibits a better thermal light off behavior. At the same overall volume, it is furthermore possible to improve the efficiency of the catalyst subassembly since NOx conversion by the SCR catalyst is greater.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A catalyst subassembly for a device for purifying exhaust gases from an internal combustion engine, the catalyst subassembly comprising:
   a common catalyst housing;
   a regeneratable particulate filter and an integral SCRF catalyst on the particulate filter for selective reduction of nitrogen oxides, where the common catalyst housing and the SCRF catalyst are usable for a plurality of variants of an internal combustion engine; and
   an SCR catalyst for selective reduction of nitrogen oxides, wherein
   the SCR catalyst is arranged upstream of the SCRF catalyst,
   the SCRF catalyst and the SCR catalyst are arranged in the common catalyst housing, and
   the SCR catalyst is variably dimensioned depending on a selected engine variant among the plurality of variants of the internal combustion engine, while the common catalyst housing and the SCRF catalyst each are identically dimensioned independently of the selected engine variant.

2. The catalyst subassembly according to claim 1, wherein the SCR catalyst comprises a metallic or ceramic through-flow substrate.

3. The catalyst subassembly according to claim 2, wherein the ceramic through-flow substrate is a disc-shaped honeycomb monolith.

4. The catalyst subassembly according to claim 1, further comprising at least one spacer element arranged between the SCR catalyst and either the SCRF catalyst or an axial wall surface of the common catalyst housing, such that a different axial extent of the SCR catalyst depending on the selected engine variant is compensated in the common catalyst housing.

5. The catalyst subassembly according to claim 1, wherein the catalyst subassembly is for a device for purifying exhaust gases from a diesel engine.

6. A modular system for a catalyst subassembly for a device for purifying exhaust gases from an internal combustion engine, the catalyst subassembly comprising a common catalyst housing; a regeneratable particulate filter and an integral SCRF catalyst on the particulate filter for selective reduction of nitrogen oxides, where the common catalyst housing and the SCRF catalyst are usable for a plurality of variants of an internal combustion engine; and an SCR catalyst for selective reduction of nitrogen oxides, wherein the SCR catalyst is arranged upstream of the SCRF catalyst, and the SCRF catalyst and the SCR catalyst are arranged in the common catalyst housing,
   wherein the modular system comprises:
   a plurality of the common catalyst housings and a plurality of the SCRF catalysts, where each common catalyst housing and each SCRF catalyst are dimensioned independently of a selected engine variant among the plurality of variants of the internal combustion engine; and
   a set of different SCR catalysts, where each SCR catalyst is differently dimensioned depending on the selected engine variant.

7. The modular system according to claim 6, wherein the SCRF catalysts of the modular system have an identical ratio of length to cross-section.

8. The modular system according to claim 7, wherein the SCRF catalysts of the modular system have identical external dimensions.

9. The modular system according to claim 8, wherein the differently dimensioned SCR catalysts have a different axial extent matched to a respective engine variant.

10. The modular system according to claim 6, wherein the SCRF catalysts of the modular system have identical external dimensions.

11. The modular system according to claim 6, wherein the differently dimensioned SCR catalysts have a different axial extent matched to a respective engine variant.

12. The modular system according to claim 6, further comprising a set of different spacer elements, the different spacer elements each being matched to dimensions of the plurality of SCR catalysts.

13. A device for purifying exhaust gases from an internal combustion engine, the device comprising:
   a catalyst subassembly, the catalyst subassembly comprising:
   a common catalyst housing;
   a regeneratable particulate filter and an integral SCRF catalyst on the particulate filter for selective reduction of nitrogen oxides, where the common catalyst housing and the SCRF catalyst are usable for a plurality of variants of an internal combustion engine; and an SCR catalyst for selective reduction of nitrogen oxides, wherein the SCR catalyst is arranged upstream of the SCRF catalyst, the SCRF catalyst and the SCR catalyst are arranged in the common catalyst housing, and the SCR catalyst is variably dimensioned depending on a selected engine variant among the plurality of variants of the internal combustion engine, while the common catalyst housing and the SCRF catalyst each are identically dimensioned independently of the selected engine variant.

14. The device according to claim 13, further comprising:
a reducing agent supply unit arranged upstream of the catalyst subassembly.

15. The device according to claim 14, further comprising:
an oxidation catalyst and/or an NOx storage catalyst arranged upstream of the catalyst subassembly and upstream of the reducing agent supply unit.

16. The device according to claim 15, further comprising an ammonia barrier catalyst arranged downstream of the catalyst subassembly.

17. The device according to claim 13, wherein the device is for a diesel engine.

18. A method for producing a catalyst subassembly from a modular system for use with a plurality of engine variants of an internal combustion engine, the method comprising the acts of:

providing a plurality of catalyst housings and a plurality of SCRF catalysts, each catalyst housing and each SCRF catalyst being identically dimensioned independently of a selected engine variant among the plurality of variants of the internal combustion engine;

selecting an SCR catalyst from a set of different SCR catalysts, the selected SCR catalyst being variably dimensioned depending on the selected engine variant; and assembling the selected SCR catalyst with the SCRF catalyst in a common catalyst housing to form the catalyst subassembly.

19. The method according to claim 18, further comprising the acts of:

selecting a spacer element from a set of the different spacer elements in accordance with dimensions of the SCR catalyst; and installing the selected spacer element in the catalyst housing.

* * * * *